(12) United States Patent
Bennett, Jr. et al.

(10) Patent No.: US 6,369,715 B2
(45) Date of Patent: *Apr. 9, 2002

(54) INTRINSICALLY SAFE SENSOR AND DATA TRANSMISSION SYSTEM

(75) Inventors: Paul R. Bennett, Jr., Houston; J. Lawrence Taylor, III, Katy, both of TX (US)

(73) Assignee: Innovative Sensor Solutions, LTD, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/851,476

(22) Filed: May 8, 2001

Related U.S. Application Data

(63) Continuation-in-part of application No. 09/541,353, filed on Mar. 31, 2000, now Pat. No. 6,229,448.
(60) Provisional application No. 60/128,868, filed on Apr. 12, 1999.

(51) Int. Cl.[7] .................................................. G08B 21/00
(52) U.S. Cl. ...................... 340/618; 300/623; 300/624; 73/305; 73/307
(58) Field of Search .................................... 340/618, 623, 340/627; 73/290 R, 305, 306, 307

(56) References Cited

U.S. PATENT DOCUMENTS

| | | | |
|---|---|---|---|
| 4,369,437 A | | 1/1983 | Thompson, Jr. et al. |
| 4,459,584 A | | 7/1984 | Clarkson |
| 5,363,093 A | | 11/1994 | Williams et al. |
| 5,610,324 A | | 3/1997 | Lawson |
| 5,642,097 A | | 6/1997 | Martel |
| 5,708,424 A | | 1/1998 | Orlando et al. |
| 5,762,118 A | | 6/1998 | Epworth et al. |
| 5,946,084 A | | 8/1999 | Kubulins |
| 5,979,227 A | | 11/1999 | Lawson et al. |
| 6,041,645 A | | 3/2000 | Lawson et al. |
| 6,229,448 B1 | * | 5/2001 | Bennett, Jr. et al. ........ 340/618 |

* cited by examiner

*Primary Examiner*—Edward Lefkowitz
(74) *Attorney, Agent, or Firm*—Bracewell & Patterson, L.L.P.

(57) ABSTRACT

A sensor monitoring system comprises a passive sensor, a monitored transmitter, a repeater, and a central receiver. The system provides easy installation, convenient calibration, and very low maintenance. The sensor and the monitored transmitter are battery powered and, in order the conserve battery power, the sensor and the monitored transmitter receive power only on command from their respective microprocessor.

16 Claims, 1 Drawing Sheet

INTRINSICALLY SAFE SENSOR AND DATA TRANSMISSION SYSTEM

This application is a Continuation In Part of U.S. patent application Ser. No. 09/541,353; filed Mar. 31, 2000, which will issue on May 8, 2001 as U.S. Pat. No. 6,229,448; which claims the benefit of U.S. Provisional Patent Application Ser. No. 60/128,868; filed Apr. 12, 1999.

FIELD OF THE INVENTION

The present invention relates generally to the field of remote sensor systems and, more particularly, to an intrinsically safe, wireless, battery-operated sensor system that conserves battery power.

BACKGROUND OF THE INVENTION

Industry and safety standards require that liquid storage tanks of the type located on petroleum tank farms be given periodic checks to determine the liquid level of each tank. Level indicators for such tanks typically comprise a tape and pulley apparatus with a float at one end of the tape within the tank and a mechanical level indicator at the other end.

This typical arrangement was improved on by Clarkson, U.S. Pat. No. 4,459,584, to include a transmitter for remote monitoring of liquid level, but the Clarkson system still required the use of the old tape and pulley system to monitor liquid level. This system suffered all of the common problems with the tape and pulley system in that such a system may mechanically jam, thereby disabling the movement of the float. Further, a large volume of volatile gases fills the conduit enclosing the tape and pulley, since this system is open to the tank. This feature alone presents a significant safety hazard. Further, the Clarkson system provides no means for calibration of the level detector, since it relies upon the old tape and pulley system.

We began the development of the present invention with a level monitoring and alarm system sold under the trademark Fillcheck®. This system included a transmitter that was mounted in an off-the-shelf NEMA-7 explosion-proof enclosure so as to enable it to be used in the electrically hazardous environments associated with petroleum storage tanks, pipelines, oil refineries, petrochemical plants, and fuel terminals. This type of mounting solved the problems described with regard to Clarkson, but it brought about certain shortcomings, such as the attenuation of the level signal. Mounting the transmitter and its antenna inside the explosion-proof enclosure significantly reduced the system's effective range. In this system, the explosion-proof transmitter had to be aimed toward its receiver or repeater for optimum performance. Further, that system was expensive, and the transmitter had to be equipped with a safety barrier so as to permit its connection to an external level switch, which added to system cost. That system was also heavy, in that explosion-proof enclosures are quite massive and add significantly to shipping and handling costs. Finally, explosion-proof enclosures are typically constructed of aluminum which is prone to pitting and corrosion, known as exfoliation, particularly when used in marine or coastal environments in which many refining and petrochemical facilities are located.

The recognition of these drawbacks of the Fillcheck® system led to the development of the system which is described and claimed in our U.S. patent application Ser. No. 09/541,353; filed Mar. 31, 2000; which will issue on May 8, 2001 as U.S. Pat. No. 6,229,448; the parent application of the present application. In that system, we disclosed an intrinsically safe transmitter which maybe used generally for sending digital signals derived from any analog sensor, including a sensor for temperature, pressure, flow rate, etc., as well as the tank level sensor for which the original system was specifically designed. The original impetus for the that system was over-fill protection for storage tanks in hazardous environments, and has proven to be successful.

In systems in which that system finds applications, sensors typically require some small amount of power to develop a sensed signal, which may then be manipulated into a signal for transmission. Although the amount of power drawn by such sensors is small, it is significant when one is dealing with remote, battery powered sensors which must operate without operator attention over a long period.

Thus, there remains a need for a sensor monitoring system which is intrinsically safe and operates only intermittently in order to conserve the precious resource of battery power. The present invention addresses this need in the art.

SUMMARY OF THE INVENTION

The system of this invention comprises four components: (1) a passive sensor; (2) a transmitter module which includes a microprocessor controller, or microcontroller; (3) a repeater (if required); and (4) a receiver. It provides easy installation, convenient calibration, and very low maintenance. It is specifically designed to provide safe and power-efficient sensor operation where external electrical power and/or alarm signal wiring to a supervised point are not available. Further, it is easily adapted to other systems which include a passive sensor providing an analog signal which is then transmitted by the system of this invention to a central monitor.

In a preferred embodiment of the invention, a passive sensor for a specific application is installed. Such a sensor may sense temperature, pressure, flow rate, vibration, torsion or other mechanical stress, level, or other parameters of interest which must be monitored periodically or otherwise on command. The sensor typically develops an analog or digital signal, which is coupled through an electrical conductor to the intrinsically safe transmitter. The sensor remains unpowered (dormant) until commanded by the microcontroller in the transmitter module to take a reading. The command from the microprocessor may be activated by a programmed clock signal within the microprocessor. When the transmitter module receives a sensed signal from the sensor, it transmits the sensed signal in digital form to a repeater (if necessary) and ultimately to the receiver at the central monitor.

The sensed signal from the sensor may also include an alarm function by including an alarm switch associated with the sensor. When the switch is activated, the transmitter broadcasts an alarm signal to the receiver. In the alarm mode of operation, a relay output at the receiver is either opened or closed thus activating the alarm or other device attached to it. The relay output may also connect to a control apparatus, such as a signal transmitter to provide for remote operation of such devices as valves.

The sensor and transmitter package are powered by the same or a secondary battery, such as for example a D cell size 3.6 V lithium thionyl chloride battery. During non-alarm conditions, a supervisory signal may be transmitted by the transmitter module under the control of the microcontroller every 30 seconds or at a selected interval. The supervisory signal contains the transmitter identification and battery condition. If the receiving system fails to hear from any of its transmitters, an inactive alarm is issued. Also, low battery alarms are issued before a transmitter's battery dies.

Any type of passive sensing device that provides an analog or digital electrical output signal can be used with this embodiment of the present invention. For example, storage vessels may include a magnetostrictive level sensor, such as a liquid level sensing system from Ametek Patriot Sensors in Clawson, Mich. These devices can be constructed of stainless steel, brass, polypropylene, or other appropriate materials, and are available in a vertical configuration. Other passive sensing devices for other parameters to be sensed can also be used in accordance with this invention.

The system of the present invention provides reliable, low cost, wireless sensor monitoring capability which conserves battery power by activating either the transmitter module or the sensor only when needed. Many applications now require such remote monitoring. Thus, this system provides continuous, fully supervised protection against conditions which routinely require monitoring. It includes a battery powered transmitter, so it needs no external electrical power at the storage tank. The transmitter is intrinsically safe (Class I Division 1 Groups C&D), and requires no FCC licensing. It has low installation and maintenance costs, and the alarms are provided with fail-safe aspects for increased reliability.

DETAILED DESCRIPTION OF PREFERRED EMBODIMENTS

Figure 1:
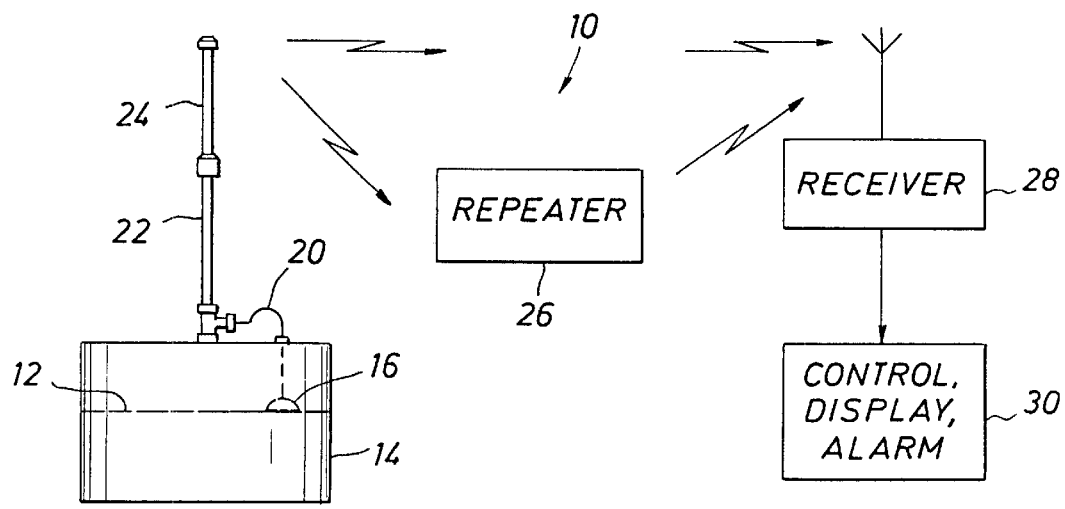
FIG. 1 is an overall schematic diagram of the level monitoring system of this invention.

FIG. 1 shows an exemplary level monitoring system 10 of this invention. It should be understood that the system 10 is equally applicable to any remote parameter which may require monitoring functions, so long as the parameter is sensed by a sensor, and the sensor develops an analog or digital signal for further manipulation by the system 10. The system may also include the alarm features of our parent application, U.S. application Ser. No. 09/541,353.

The system shown in FIG. 1 monitors the fluid level 12 in a storage tank 14. The fluid level is detected by a passive level sensor 16 which moves vertically with fluid level 12. The level sensor 16 is coupled by a wire 20 to the interior of a mast 22, which supports a transmitter module 24.

The passive level sensor requires electrical power in order to be activated to give a level indication. The provision of electrical power is microprocessor activated, as described below with regard to FIGS. 2 and 3. The transmitter module 24 also remains dormant until activated by microcontroller command.

Upon activation, the transmitter module 24 transmits a signal, either to an intermediate repeater 26, if required, or directly to a receiver 28. The repeater 26 is required if the distance from the transmitter module 24 to the receiver 28 is too great to transmit directly to the receiver 28, which may be located in a distant control room. In a preferred embodiment, the receiver 28 may be dedicated to a specific transmitter module 24, or the system can be configured so that the repeater 26 boosts signals from a number of transmitters and other repeaters. The repeater 26 is preferably mounted within a weatherproof nonmetallic (NEMA 4X) enclosure that can be purged for use in hazardous areas. It uses AC power, with an internal backup battery included to continue operation through power outages. The repeater 26 may have a specified range, for example of up to 3 km (line of sight). Additional repeaters can be used for greater distances or to clear obstructions.

The receiver 28 may operate as a stand-alone receiver (discrete) or with a computer interface (serial). Discrete receivers may have an LED display indicating exact tank location, fluid level, or the value of any other sensed parameter, such as pressure in psig, temperature in degrees Fahrenheit, or variation from a specified norm or limit, etc. If the system operates with a computer interface, the receiver 28 can monitor hundreds of similar transmitter modules 24. Receivers 28 may only "listen" for transmitters and repeaters programmed to them.

Once the receiver 28 senses a received signal from the transmitter module 24, a central station 30, labeled in FIG. 1 with the functions of control, display, and alarm, provides means for displaying the value of the signal from the sensor. Such a display may comprise a separate gauge, but preferably comprises a selectable readout display on a computer monitor. The receiver 28 may also provide relay outputs which can be used to sound an alarm, shut off a pump, close a valve, activate a telephone auto-dialer, or operate almost any other device.

It should be noted that the system of this invention is also adaptable to other applications where a passive switch can sense an out of specification condition. For example, certain systems require proper operation within a band of pressures, and such a system may include a passive switch for each of the upper and lower pressure settings. Such an application and others are within the scope and spirit of the present invention.

It is particularly noteworthy in the system shown in FIG. 1 that the transmitter module and the sensing device are intrinsically safe. No spark producing components are exposed to volatile gases, and such gases are retained entirely within the tank 14, unlike known systems. It should also be noted that the receiver 28 may be dedicated to many such sensor monitoring systems, and may passively monitor all of the sensor monitoring systems assigned to it. Further, as shown in FIG. 1, the system is independent of external power requirements, and it is independent of communication wiring from the transmitter module 24 to the receiver 28.

Figure 2:
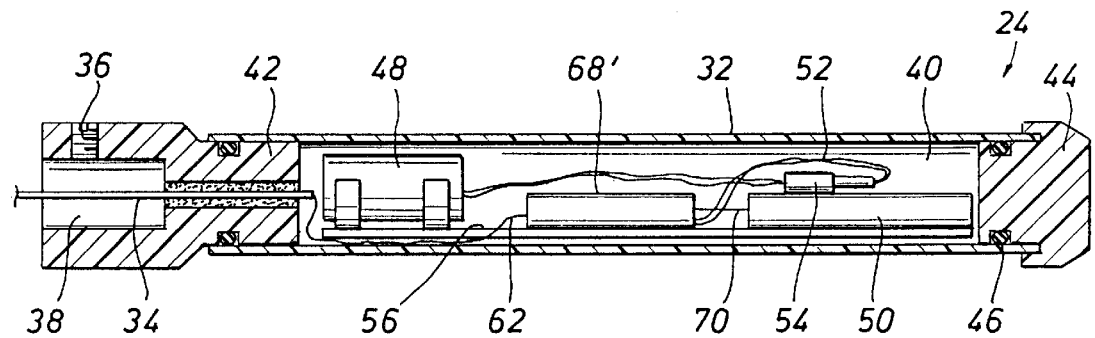
FIG. 2 is a detail cross-section view of the transmitter module of this invention.

Referring to FIG. 2, the transmitter module 24 includes a sealed outer shell 32, such as fiberglass or other durable, weather resistant material. The transmitter module 24 mounts onto the mast 22, such as for example with a cavity 34 to receive the top of the mast, and may be secured with a set screw 36. Also through the mast is a multi-strand electrical conductor 38, which is coupled at the tank 14 to the level sensor 16.

The conductor 38 is directed into a sealed chamber 40, which is sealed at the bottom with a bottom wall 42 and at the top with a top cap 44. The top of the chamber 40 is further sealed with an O-ring seal 46. The conductor 38 penetrates the bottom wall 42 through a stuffing tube, or is otherwise potted to seal the penetration with the wall 42.

The chamber 40 includes a battery 48, a transmitter 50, and a microcontroller 68'. The battery is preferably a lithium thionyl chloride battery, available from Tadiran in Port Washington, N.Y., selected because of its high power density and long life. The system may also include a solar charging system (not shown) in order to extend the useful life of the battery even further between replacement cycles. The battery is mounted into the transmitter module 24 with battery clips, and is electrically coupled to the transmitter 50 with wires 52 and a battery connector 54. The battery 48, transmitter 50, and microcontroller 68' are preferably assembled as a unit onto a backbone 56, for ease of installation and maintenance. The battery 48 may also provide power to the sensor by way of the electrical conductor 38 through the wall 42, if desired.

The transmitter 50 is self-contained, intrinsically safe, and very reliable. Once the level sensor 16 is activated, the transmitter module 24 sends a radio frequency signal, which includes a unique identifying code to distinguish the transmitter from any other transmitter included in the system 10. It should be noted that the microcontroller 68' may include buffer memory so that the sensed signal need not be transmitted immediately. The onboard battery 48 (which also powers the sensors) has a 2–3 year life, and provides fully supervised operation. A supervisory signal is transmitted by the transmitter 50 periodically, for example every 30 seconds, which contains the ID Code of the specific transmitter module 24 and battery condition. If the receiver 28 or the central station 30 the fails to hear from any of its associated transmitters, such as transmitter module 24, an inactive alarm is issued. Also, low battery alarms may be issued about 30 days before a transmitter's battery dies.

The transmitter 50 may comprise a 900 MHz spread spectrum device that contains an onboard processor and non-volatile ROM. The transmitter 50 is preferably awakened from its dormant state by its own onboard processor, but it may alternatively be controlled by the microcontroller 68'. The transmitter 50 is enclosed in a fiberglass housing, and contains the components shown in FIG. 3.

Figure 3:
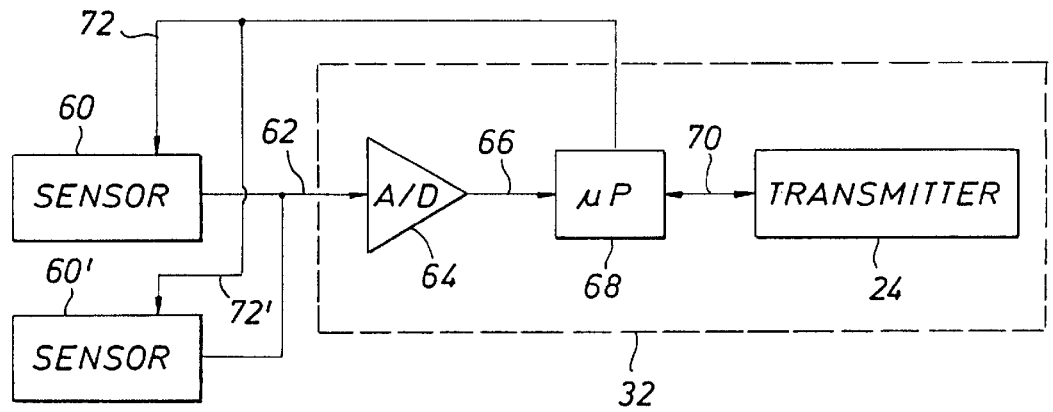
FIG. 3 is a schematic diagram of the invention adapted for use with a passive sensor.

Referring now to FIG. 3, an embodiment including the features of the invention is disclosed. The transmitter module 24 includes the sealed outer shell 32 as previously described. In this case, a passive sensor 60, which may detect temperature, pressure, flow rate, level, or any other appropriate parameter which may vary over time, is placed where it is exposed to the parameter. The transmitter module 24 may also be dedicated to more than one such sensor, such as for example a sensor 60'. The sensor 60 or 60' provides an analog signal over a signal line 62 to an analog to digital (A/D) converter 64. The A/D converter digitizes the analog signal, and conducts that digital signal over a communication line 66 to a microprocessor 68. If the sensor 60 or 60' provides a digital form of the sensed signal, the A/D converter is bypassed. The microprocessor is programmed to monitor the incoming digital signal for a limit condition or a band of specific values. The digitized signal is processed by the microprocessor 68 into a transmitter signal over a communication line 70, and the transmitter signal may be periodically transmitted by the transmitter module 24 to periodically monitor the predetermined parameter, or the transmitter may only be activated if an out of specification condition develops.

The sensors 60 and 60' may also be provided with command lines 72 and 72', respectively. The microprocessor 68 issues a command to turn on the sensors; otherwise the sensors remain de-energized, in order to conserve energy. The command signal to energize the sensors originates from a timed periodic programmed command from the microprocessor 68.

The principles, preferred embodiment, and mode of operation of the present invention have been described in the foregoing specification. This invention is not to be construed as limited to the particular forms disclosed, since these are regarded as illustrative rather than restrictive. Moreover, variations and changes maybe made by those skilled in the art without departing from the spirit of the invention.

We claim:

1. A sensor monitoring and alarm system adapted for use in an electrically hazardous environment, the system comprising:
   a. a battery;
   b. a sensor to sense a time varying parameter, the sensor sealed from volatile gases and powered by the battery;
   c. a switch coupled to the sensor and adapted to change state at a predetermined reading from the sensor;
   d. an intrinsically safe, monitored transmitter activated by the switch and adapted to transmit, upon activation, an alarm signal which uniquely identifies the sensor being monitored, the monitored transmitter powered by the battery;
   e. a central receiver to monitor the monitored transmitter, to receive the alarm signal from the monitored transmitter, and to generate a response signal;
   f. a responsive unit to receive the response signal from the receiver and to develop an action as a result of the response signal; and
   g. means for applying battery power to the sensor on command.

2. The system of claim 1, wherein the action comprises an alarm.

3. The system of claim 1, wherein the action comprises a control signal.

4. The system of claim 1, wherein the transmitter module is sealed within a weather resistant enclosure.

5. The system of claim 4, wherein the switch is coupled to the monitored transmitter by a wire which penetrates the enclosure.

6. The system of claim 1, further comprising a repeater to receive a signal from the monitored transmitter and to retransmit the signal to the receiver.

7. The system of claim 6, wherein the repeater is adapted to receive and distinguish signals from a plurality of transmitters.

8. The system of claim 1, wherein means for applying battery power to the sensor on command includes a microcontroller.

9. The system of claim 8, wherein the microcontroller develops a command signal to energize the sensor periodically.

10. The system of claim 1, wherein the responsive unit is further adapted to transmit control commands.

11. The system of claim 1, wherein the sensor develops a digital signal.

12. The system of claim 1, wherein the sensor develops an analog signal, and further comprising an analog to digital converter to digitize the analog signal.

13. A monitoring system comprising:
a. a battery;
b. a battery-operated sensor to sense a time-varying parameter and to develop an analog signal representative of the parameter, the sensor sealed from environmental conditions;
c. an analog to digital converter to receive the analog signal and convert the analog signal to a digital signal;
d. a microprocessor to receive the digital signal and to process the digital signal to a transmitter signal, the microprocessor adapted to selectively energize the sensor from the battery;
e. an intrinsically safe transmitter selectively activated by the microprocessor from the battery and adapted to transmit, upon activation, a monitored signal representative of the parameter or representative of the status of the system; and
f. a central receiver to receive the monitored signal from the transmitter.

14. The monitoring system of claim 13, wherein the status of the system includes battery condition.

15. The monitoring system of claim 13, wherein the microprocessor selectively energizes the sensor from the battery periodically.

16. The monitoring system of claim 13, wherein the parameter is fluid tank level.

* * * * *